United States Patent [19]

Lamping et al.

[11] 3,960,115

[45] June 1, 1976

[54] STRATIFIED CHARGE ROTARY ENGINE (METHOD OF OPERATION)

[75] Inventors: Harold D. Lamping, Oakland; David M. Myers, Upper Saddle River, both of N.J.

[73] Assignee: Curtiss-Wright Corporation, Wood-Ridge, N.J.

[22] Filed: Oct. 4, 1974

[21] Appl. No.: 512,342

[52] U.S. Cl. .............................................. 123/8.09
[51] Int. Cl.² ........................................ F02B 53/10
[58] Field of Search .............. 123/8.09, 8.11, 8.13

[56] References Cited
UNITED STATES PATENTS

| | | | |
|---|---|---|---|
| 3,174,466 | 3/1965 | Scherenberg | 123/8.11 |
| 3,190,269 | 6/1965 | Tado | 123/8.11 |
| 3,246,636 | 4/1966 | Bentele | 123/8.09 |
| 3,310,042 | 3/1927 | Haas | 123/8.09 X |
| 3,698,364 | 10/1972 | Jones | 123/8.09 |

FOREIGN PATENTS OR APPLICATIONS 1,027,787    4/1966    United Kingdom ............... 123/8.09

Primary Examiner—C. J. Husar
Assistant Examiner—Leonard Smith
Attorney, Agent, or Firm—Victor D. Behn; Arthur Frederick

[57] ABSTRACT

A rotary combustion engine having two fuel nozzles for discharging fuel into each engine working chamber with fuel being discharged from only one of the nozzles during low power operation of the engine and being discharged from both nozzles during high power operation of the engine.

2 Claims, 7 Drawing Figures

STRATIFIED CHARGE ROTARY ENGINE (METHOD OF OPERATION)

BACKGROUND OF THE INVENTION

The invention relates to a rotary internal combustion engine of the type disclosed in prior U.S. Pat. No. 2,988,065 and particularly to such an engine designed for operation as a stratified charge engine having two high pressure fuel injection nozzles. Prior stratified charge rotary combustion engines having dual fuel nozzles are disclosed in U.S. Pat. No. 3,698,364 and in co-pending patent application, Ser. No. 424,056 filed Dec. 12, 1973, now U.S. Pat. No. 3,894,518 granted to Gavrun et al on July 15, 1975.

Such prior stratified charge rotary combustion engines at times experience difficulties with combustion including combustion initiation when the engine is being operated at low power. This results from the fact that the fuel discharged by each nozzle does not provide a sufficiently rich fuel mixture in the region of either of its nozzles to insure consistent ignition. The invention is particularly concerned with a rotary combustion engine having a dual fuel nozzle injection system as disclosed in the aforementioned co-pending patent application. In this latter fuel injection system the fuel discharging from one of the nozzles is ignited as it discharges into each engine working chamber to form a pilot flame to ignite the fuel discharging into said chamber from the other nozzles.

SUMMARY OF THE INVENTION

An object of the invention is to provide a rotary combustion engine having a novel dual fuel nozzle injection system in which the aforementioned ignition difficulties at low engine power operation are minimized.

Another object of the invention is to provide a novel dual fuel injection system for a rotary combustion engine in which, during low power engine operation, fuel is discharged only from one of the nozzles and, during higher power engine operation, fuel is discharged from both nozzles.

In accordance with the invention, each fuel injection nozzle is provided with its own piston-type positive displacement fuel injection pump and means are provided to control the effective stroke of each pump so that at low engine power only one of the pumps delivers fuel whereas at higher engine power both pumps deliver fuel. With such a fuel injection system, when the fuel pumps are set for low power operation of the engine, all the fuel is supplied by one of the pumps and, therefore, a richer fuel mixture is provided in the region of the fuel nozzle supplied by this pump than would be the case if the fuel were divided between two nozzles. For this reason, with the dual nozzle fuel injection system of the present invention, the fuel mixture at the nozzle delivering fuel at low engine power is more readily ignitable than would be the case if the fuel were divided between two nozzles.

Other objects of the invention will become apparent upon reading the following detailed description in connection with the drawings.

BRIEF DESCRIPTION OF DRAWINGS

FIGS. 3 and 4 are perspective views illustrating portions of the pistons of the two fuel injection pumps;

DESCRIPTION OF PREFERRED EMBODIMENTS

Figure 1:
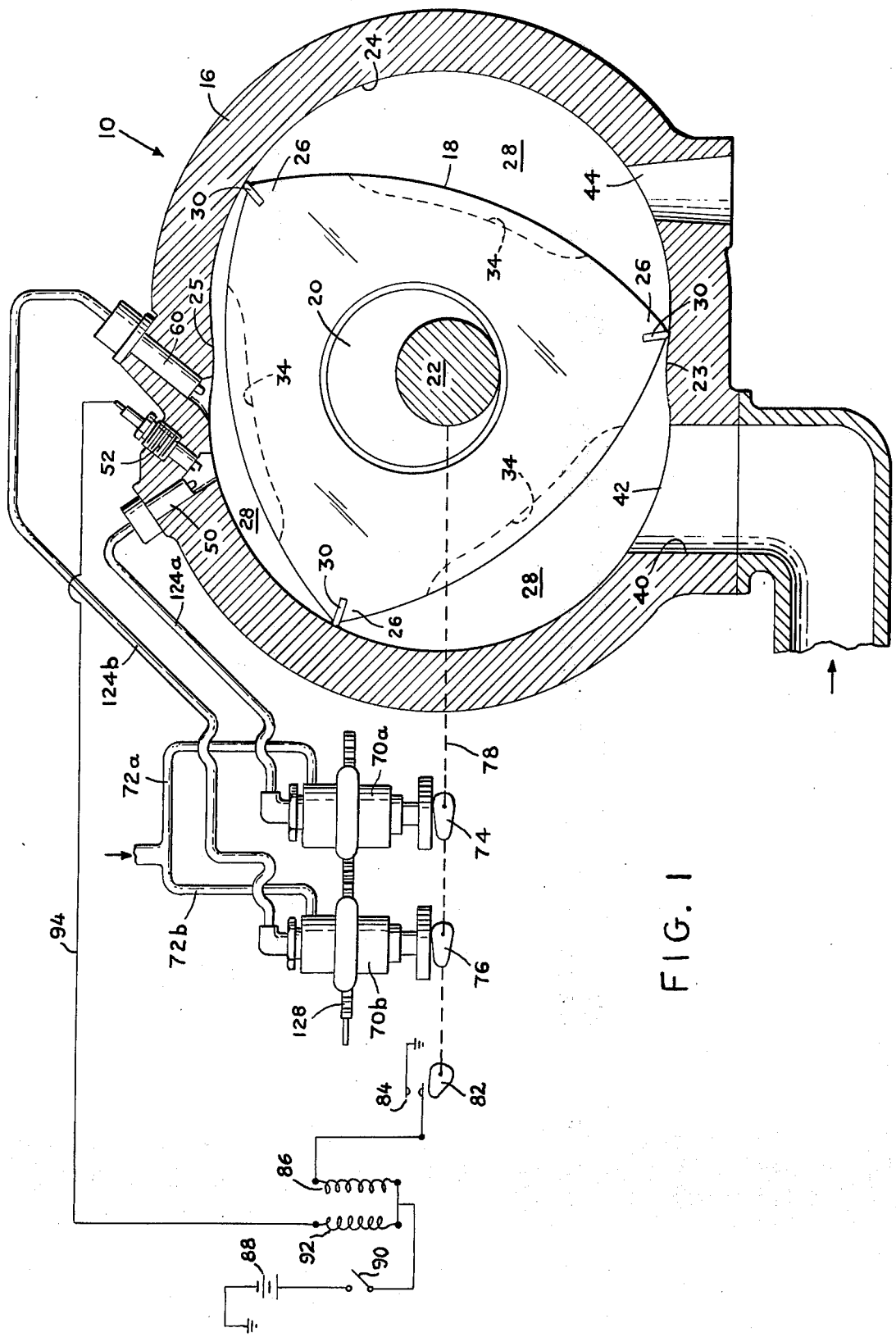
FIG. 1 is a schematic view of a rotary combustion engine and fuel injection system therefor embodying the invention.

Referring to FIG. 1 of the drawing, a rotating combustion engine is schematically indicated at 10, the engine being generally similar to the type disclosed in said aforementioned prior patents. As is more fully disclosed in said prior patents, the engine 10 comprises an outer body or housing consisting of two axially spaced end housings (not shown) and an intermediate or rotor housing 16, the housings being secured together to form an engine cavity therebetween. An inner body or rotor 18 is journaled for rotation within said engine cavity on an eccentric portion 20 of a shaft 22 which extends coaxially through the housing.

The peripheral inner surface 24 of the intermediate housing 16 is illustrated as having a two-lobe profile which preferably is basically an epitrochoid, said two lobes joining at junctions 23 and 25. The rotor 18 has a generally triangular profile with apex portions 26 having sealing cooperation with the trochoidal surface 24 to form three engine working chambers 28 between the rotor and the housing. For this purpose, each of the rotor apex portions is provided with a seal 30 which extends across the rotor between the inner walls of the end housings and the rotor also has suitable seals (not shown) provided on the side faces of the rotor. Each of the three peripheral surfaces of the rotor preferably is provided with a trough-like recess 34.

The engine 10 also includes suitable gearing (not illustrated) between the rotor 18 and the engine housing to control the relative rotation of the rotor; such gearing is conventional and preferably is similar to that illustrated in the aforementioned prior patents.

An air intake passage 40 supplies air to an air intake port 42 disposed adjacent to and at one side of the junction 23 of the two lobes of the trochoidal peripheral surface 24. The said intake passage 40 extends through the intermediate housing 16 and the port 42 opens through the inner trochoidal surface 24 of intermediate housing 16 and preferably is characterized by the absence of any air throttle valve. As is common in such rotary engines, the intake passage 40 could open into the engine cavity through a side wall of the engine housing instead of as illustrated through the intermediate housing 16. An exhaust port 44 is formed in the intermediate housing 16 adjacent to and on the opposite side of said junction 23. The engine combustion is initiated in the engine working chambers 28 in the vicinity of the other junction 25 of the two lobes of trochoidal surface 24.

A first fuel nozzle 50 is mounted on the intermediate housing 16 adjacent to the lobe junction 25. The fuel nozzle 50 has its fuel discharge end disposed in a recess opening through the trochoidal surface 24 for discharging fuel into each working chamber after the air-intake charge within the chamber has been substantially compressed and combustion is about to be initiated. A spark plug type igniter 52 is also mounted on the intermediate housing adjacent to the lobe junction 25 and adjacent to the nozzle 50. The electrodes of the spark plug 52 are disposed adjacent to the discharge end of the nozzle 50 preferably so that said nozzle discharge end and the spark plug electrodes both open through the trochoidal surface 24 through a common recess. In addition, the fuel nozzle 50 and spark plug 52 preferably are disposed so that at least a portion of the fuel vapor produced by fuel spray discharged from the nozzle passes in close proximity to said spark plug electrodes immediately as the fuel leaves the nozzle 50 for ready ignition by said spark plug.

The ignition circuit for the spark plug 52 preferably is arranged to fire the spark plug while fuel is discharging from the nozzle 50 into a working chamber 28 so that a portion of this fuel is ignited at the fuel nozzle 50 as it discharges from the nozzle and the burning of this initial portion of the fuel discharged from the nozzle 50 ignites the balance of the fuel discharging from said nozzle.

A second fuel nozzle 60 is also mounted on the intermediate housing 16 adjacent to the lobe junction 25 so that this second nozzle is adjacent to the fuel nozzle 50 and spark plug 52. Like the fuel nozzle 50, the fuel nozzle 60 has its discharge end disposed close to the trochoidal surface 24 so as to minimize the size of the recess at the trochoid surface 24 and to minimize leakage around the apex seals 30 as they pass over the nozzle recess at the trochoidal surface 24. As in the case of the nozzle 50, the second fuel nozzle 60 is arranged to initiate the discharge of its fuel into each working chamber 28 after the air charge in said chamber has been substantially compressed and combustion is about to be initiated.

A pair of similar positive displacement pumps 70a and 70b are provided for discharging predetermined quantities of fuel from the nozzles 50 and 60 respectively into each working chamber 28. Fuel is supplied to the pumps 70a and 70b by fuel supply lines 72a and 72b respectively preferably from a common fuel supply source. Cams 74 and 76, driven from the engine shaft 22 by means schematically indicated at 78, are arranged to actuate the fuel pumps 70a and 70b. As disclosed in said prior patents, the engine shaft 22 rotates at three times the speed of the rotor and therefore in order to supply fuel successively to each of the three working chambers 28, the shaft 22 is arranged to actuate each fuel pump 70a and 70b once each revolution of the shaft.

A third cam 82, also driven from the shaft 22, is arranged to operate the make-and-break contacts 84 of the ignition circuit. The ignition circuit illustrated is conventional and includes a coil, the primary 86 of this coil being connected to a battery 88, ignition switch 90 and the make-and-break contacts 84. The secondary winding 92 of the ignition coil is connected to the spark plug 52 by a line 94. The cam 82 is positioned so as to activate the spark plug 52 preferably at substantially the same time fuel begins to discharge from the nozzle 50. Although a specific ignition circuit has been described, the present invention is not limited to use with any specific form of ignition system.

The fuel injection pump 70a includes a two-part housing 110a, a rotatable inner sleeve 112a and a reciprocal plunger or piston 114a within said sleeve. The plunger is urged by a spring 116a to its downward position (as viewed in the drawing) against the cam 74. Fuel is supplied from the fuel passage 72a to an annulus 118a between the housing 110a and sleeve 112a. The sleeve 112a has a radial passage 120a therethrough from which fuel supplied to the annulus 118a discharges into the sleeve to fill the space 119a within said sleeve between the head end of the piston 114a and the opposite end of the sleeve 112a which is closed by a check valve 122a. After the piston 114a is driven upwards by the cam 74 and (as hereinafter described) slides over the passage 120 to close this passage, further upward movement of the piston 114a is effective to pump the fuel trapped above it through the check valve 122a and out through the line 124a to the fuel nozzle 50 for discharge therefrom into a working chamber 28.

The fuel injection pump 70b is generally similar to the pump 70a and for ease of understanding, the parts of 70b corresponding to parts of the pump 70a, are indicated by the same reference numerals but with the addition of a letter b instead of the letter a. Accordingly, no further description of pump 70b is deemed necessary.

The structure so far described is generally similar to that disclosed in the aforementioned co-pending patent application Ser. No. 424,056.

In order to vary the effective strokes of the pumps 70a and 70b, their sleeves 112a and 112b are each rotatable through a limited angle and for this purpose said sleeves are provided with gear sectors 126a and 126b respectively, said gear sectors being disposed in meshing engagement with a rack 128. Rack 128 thereby is linearly movable for simultaneously adjusting the rotative positions of the pump sleeves 112a and 112b for the purpose (as hereinafter described) of controlling the effective stroke of each pump 70a and 70b and therefore the power output of the engine.

In accordance with the invention the pumps 70a and 70b are designed so that the pump 70a is effective to pump fuel throughout the power range of the engine, that is, throughout the range of movement of rack 128 while the pump 70b is effective to pump fuel only during the high power portion of the range of engine operation. This mode of operation of the pumps 70a and 70b is graphically illustrated in FIG. 5.

Figure 3:
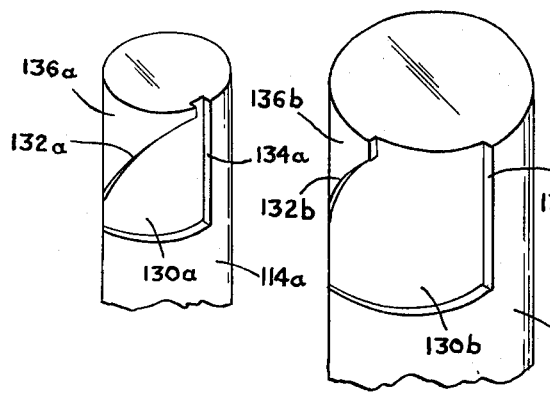

In order to accomplish the desired regulation of the fuel pump 70a, the upper portion of the side wall of its piston 114a is recessed as indicated at 130a so that the junction of the upper portion of this recess with the piston side wall has a generally helical-like edge 132a. The configuration of this helical edge recess 130a of the piston 114a is best seen in FIG. 3.

Figure 2:
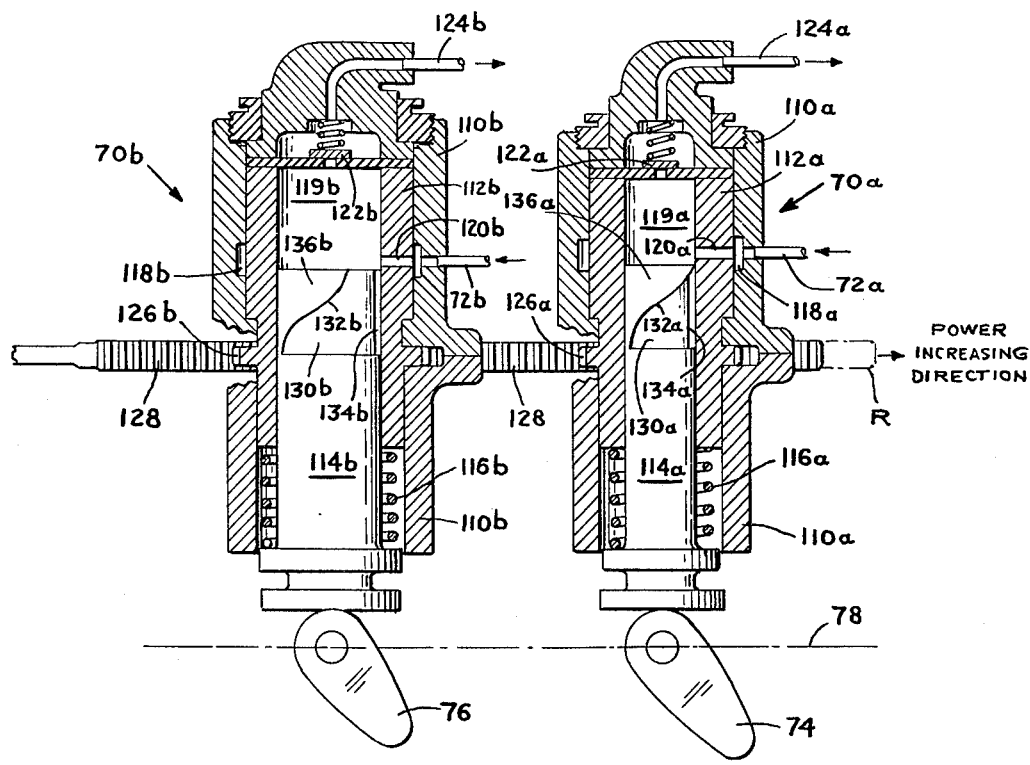
FIG. 2 is an enlarged axial sectional view through the fuel injection pumps incorporated in the system of FIG. 1.

In FIG. 2 the rack 128 is in its zero fuel position and therefore the pump 70a is in its position for zero fuel delivery. Thus, its sleeve 112a has been rotated by the rack 128 to a position such that the fuel supply passage 120a in the sleeve 112a is vertical in alignment with the portion of the piston recess 130a adjacent to the vertical edge 134a of said recess. Hence, with the sleeve 112a in this position the piston is not effective to close the passage 120a as it is raised by the cam 74. Accordingly, with the sleeve 112a in the position of FIG. 2, no fuel is pumped by the pump 70a. However, when the sleeve 112 is rotated from its position in FIG. 2 as a result of movement of the rack 128 to the right (as viewed in FIGS. 1 and 2) the piston portion 136a now covers the fuel supply passage 120a during a portion of each stroke of the piston by the cam 74. Since the piston portion 136*a* has a helical-like lower edge 132*a*, the length of time the fuel passage 120*a* remains closed in this manner depends on the extent to which the sleeve 112 has been rotated by the rack 128. Accordingly, during each stroke of the piston 114*a*, as long as the fuel supply passage 120*a* is covered by the piston portion 136*a*, the fuel trapped above the piston in the space 119*a* is pumped through the line 124*a* to discharge from the nozzle 50 into a working chamber 28. However, as soon as the piston 114*a* rises sufficiently in each stroke so that the helical edge 132*a* passes beyond the passage 120*a* to uncover this passage, fuel is no longer trapped in the space 119*a* and, therefore, the remainder of the stroke of the piston is ineffective to pump additional fuel. The edge 132*a* thereby determines the effective end of each stroke of the pump 70*a*. Since the piston edge 132*a* is helical, the pump 70*a* delivers progressively more fuel per pump stroke to the working chamber 28 as the rack 128 is moved further to the right to rotate the sleeve 112*a*. Accordingly, with this configuration of the piston recess 130*a* and its helical edge 132*a*, the quantity of fuel delivered by the pump 70*a* to each working chamber 28*a* for each position of the rack 128 is as shown by a curve A in FIG. 5.

In FIG. 2 the sleeve 112*b* of the pump 70*b* is also in its zero fuel delivery position. However, as illustrated in FIGS. 2 and 4, in the pump 70*b* the helical edge 132*b* (stroke determining edge) of the pump piston 114*b* is rotatively displaced a substantial distance from the vertical edge 134*b* of the piston recess 130*b*. Hence, as the pump sleeve 112*b* is rotated, the piston 114*b* initially is ineffective to cover the fuel supply passage 120*b* until the rack 130 has moved the sleeve 112*b* through a sufficient angle to bring the passage 120*b* in vertical alignment with the piston portion 136*b*. Accordingly, during the initial portion of the adjustment of the rack 128 in a power increasing direction (that is, to the right as viewed in FIGS. 1 and 2), the quantity of fuel delivered by the pump 70*b* to the fuel nozzle 60 remains at zero until the rack 128 reaches an intermediate position designated R in FIGS. 2 and 5. Upon further movement of the rack 128 in a power increasing direction, the fuel passage 120*b* of the pump 70*b* is now brought into vertical alignment with the piston portion 136*b* and therefore the piston 114*b* is now effective to cover the passage 120*b* during a portion of each stroke of the piston 114*b*. Since the edge 132*b*, like the edge 132*a* has a helical-like profile, the pump 70*b* delivers more fuel per stroke to working chambers 28 through a nozzle 60 as the rack 128 is moved further to the right from the point R. The curve B in FIG. 5 graphically shows the quantity of fuel delivered by the pump 70*b* for each stroke of the pump through the nozzle 60 to each working chamber for each position of the rack 128. Curve C in FIG. 5 shows the variation with position of the power control rack 128 of the total quantity of fuel delivered by the two pumps 70*a* and 70*b* for each stroke of said pumps during the power range in which the pump 70*b* is also delivering fuel.

Figure 5:
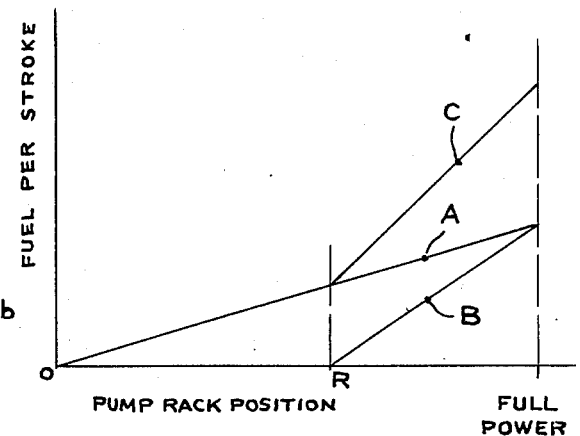
FIG. 5 is a graph illustrating the quantity of fuel supplied by each pump for each stroke of the pump as the pump rack is moved from its low power position to full power position.

As shown in FIG. 5, although the pump 70*b* does not start to deliver fuel until the power setting of the rack 128 reaches an intermediate setting R, when the rack is set to its full power position both pumps 70*a* and 70*b* deliver substantially the same quantity of fuel to the working chambers. In order to achieve this, the rate of increase of fuel discharged from the nozzle 60, as the rack 128 is moved to the right to higher power settings from the position R, is greater than the rate of increase of the fuel discharge from the nozzle 50. Obviously this can be achieved by appropriate design and positioning of the helical edges 132*a* and 132*b* of the two pumps even through the pump pistons 114*a* and 114*b* are of the same diameter and/or as illustrated, the pump piston 114*b* could be provided with a larger diameter.

As described, the pump 70*b* does not start to deliver fuel until the rack 128 has been set above the intermediate power setting R and therefore the nozzle 60 delivers no fuel to the working chambers at power settings of the rack below the setting R. With such an arrangement there may be a possibility of the nozzle 60 becoming clogged when the engine is being operated at power settings of the rack 128 below the setting R. To avoid this possibility the pump 70*b* could be designed to deliver a small constant quantity of fuel through the nozzle 60 to each working chamber at such low power settings.

Figure 6:
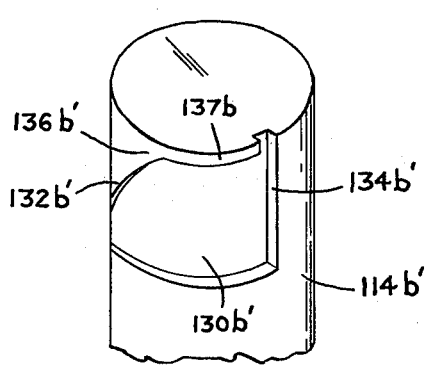
FIG. 6 is a view similar to FIG. 4 but illustrating a modified form of the invention.

Such modification of the pump 70*b* is shown in FIG. 6 where a modified piston for substitution in the pump 70*b* is illustrated. FIG. 6 is generally similar to FIG. 4 except the stroke determining edge of the piston has been modified. For ease of understanding, the parts of FIG. 6 have been designated by the same reference characters as in FIG. 4 but with the addition of a prime symbol.

Figure 7:
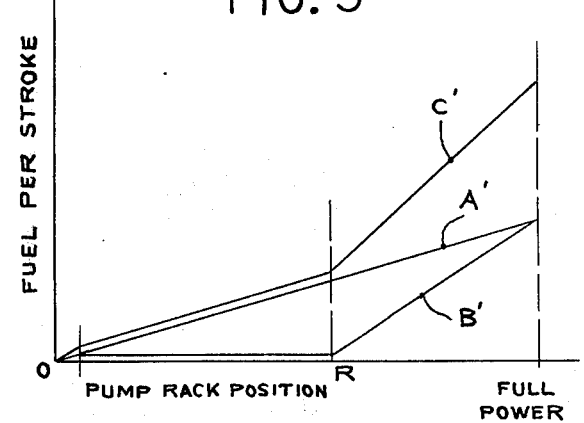
FIG. 7 is a graph similar to FIG. 5 but for the modification of FIG. 6.

As appears in FIG. 6, the piston portion 136*b*′ has a narrow part 137*b* extending toward the edge 134*b*. With this change in the piston, during low power settings of the rack 128 the narrow portion 137*b* is effective to cover the fuel passage 120*b* for a short time during each stroke of the pump piston 114*b*′. As a result, with the modified piston 114*b*′ substituted in the pump 70*b*, each stroke of the thus modified pump 70*b* during low power settings on the rack 128 is effective to deliver a small constant quantity of fuel through the nozzle 60 to each working chamber 28. Preferably, this small quantity of fuel delivered by the thus modified pump 70*b* is only sufficient to keep the nozzle 60 from clogging and does not materially contribute to the engine power output. Also this small quantity of fuel discharged into each working chamber from the nozzle 60 during low power settings of the rack 128 remain constant until the pump sleeve 112*b* has been rotated sufficiently by the rack 128 to bring the fuel passage 120*b* in alignment with the helical edge portion 132*b*′ of the piston 114*b*′. With the pump 70*b* modified as in FIG. 6, the fuel curve for this pump now is as shown by curve B′ in FIG. 7. This latter figure also shows the curve A for the pump 70*a* and a curve C′ showing the total flow delivered by the two pumps, that is, by the pump 70*a* and by the pump 70*b* as modified in FIG. 6.

It is not essential to the invention that both pumps 70*a* and 70*b* deliver equal quantities of fuel at the fuel power setting of the rack 128. For example, the fuel supply system of the invention may be designed so that the major portion of the fuel is delivered by the pump 70*b* when the engine is operating in its high power range.

Although the invention has been described in connection with the dual fuel injection system of co-pending patent application Ser. No. 424,056, the invention is applicable to any rotary engine having a dual fuel injection system, for example, such as shown in prior U.S. Pat. No. 3,698,364. In addition, it is not essential to the invention that the two fuel nozzles be disposed adjacent to each other. Also, it is within the scope of the invention to utilize other types of fuel pumps having means for varying the quantity of fuel delivered by each pump for each pump stroke.

Accordingly, it should be understood that this invention is not limited to the specific details of construction and arrangement thereof herein illustrated and that changes and modifications may occur to one skilled in the art without departing from the spirit or scope of the invention.

What is claimed is:

1. A rotary combustion engine comprising:
   a. an outer body having an internal cavity, the peripheral surface of which has a multi-lobe profile, said outer body also having an air-intake passage and a combustion gas exhaust passage, said air-intake passage being characterized by the absence of any air throttling valve,
   b. an inner body of generally polygonal profile mounted for relative rotation within said outer body, the apex portions of said inner body having sealing cooperation with said peripheral surface to define a plurality of working chambers which vary in volume in response to said relative rotation,
   c. first and second fuel nozzles each mounted on said outer body for discharging fuel into each engine working chamber after the air charge therein has been substantially compressed,
   d. mechanism for regulating the fuel discharged by said nozzles into each engine working chamber, said mechanism including a single engine power control member operable for adjusting said mechanism so that during a relatively low power range of movement of said member the quantity of fuel supplied by the second nozzle remains substantially constant at a relatively low value and the quantity of fuel supplied by the first nozzle progressively increases as said power control member is moved in a power increasing direction, while during a higher power range of movement of the power control member the quantity of fuel supplied by the second nozzle increases at a faster rate than that supplied by the first nozzle as the power control member is moved in a power increasing direction in said higher power portion of its range of movement, and
   e. ignition means disposed immediately adjacent to said first fuel nozzle such that its electrodes are disposed in a recess in the outer body through which said first fuel nozzle discharges and such that said ignition means ignites fuel promptly as it discharges from said first fuel nozzle.

2. A rotary combustion engine as claimed in claim 1 and including a first positive displacement pump for supplying fuel to said first fuel nozzle and a second positive displacement pump for supplying fuel to said second fuel nozzle, each said pump comprising piston and cylinder members having a cooperating helical-like edge determining the effective stroke of said pump with one of said members of each pump being connected to the power control member for rotation thereby to vary the effective strokes of said pumps.

* * * * *